United States Patent [19]

Middelbeek

[11] 3,716,999

[45] Feb. 20, 1973

[54] MECHANICAL BUFFER OF RESILIENT MATERIAL SUCH AS RUBBER, IN PARTICULAR FENDER FOR SHIPS

[76] Inventor: Cornelis G. Middelbeek, 12 Gooland, Nootdrop, Netherlands

[22] Filed: April 14, 1970

[21] Appl. No.: 28,372

[30] Foreign Application Priority Data

April 21, 1969 Netherlands ........................ 6906141

[52] U.S. Cl. ........................................ 61/48, 267/140
[51] Int. Cl. ................................................. E02b 3/22
[58] Field of Search ..... 61/48; 114/219; 248/24, 363; 267/30, 139, 140, 141, 152; 285/239; 4/255

[56] References Cited

UNITED STATES PATENTS

| 2,315,225 | 3/1943 | Rogers | 285/239 |
| 2,607,927 | 8/1952 | Scott | 4/255 |
| 2,655,005 | 10/1953 | Kinneman | 61/48 |
| 3,235,244 | 2/1966 | Hein | 114/219 X |
| 3,361,467 | 1/1968 | Ludwikowski | 267/140 X |
| 3,417,950 | 12/1968 | Johnson | 248/24 |

FOREIGN PATENTS OR APPLICATIONS

| 695,430 | 10/1964 | Canada | 248/24 |
| 1,077,540 | 3/1960 | Germany | 267/152 |
| 167,303 | 5/1959 | Sweden | 248/24 |

Primary Examiner—David J. Williamowsky
Assistant Examiner—David H. Corbin
Attorney—Stevens, Davis, Miller & Mosher

[57] ABSTRACT

A resilient buffer such as a fender for ships having a frusto-conical cup-shaped body of resilient material. Rigid reinforcement bars are preferably moulded within the conical wall so as to prevent buckling of the walls. Circumferential rings prevent radial movement of adjacent bars at only one end so the other ends are free to spread apart when the resilient material is deformed by an axial pressure.

14 Claims, 8 Drawing Figures

PATENTED FEB 20 1973

MECHANICAL BUFFER OF RESILIENT MATERIAL SUCH AS RUBBER, IN PARTICULAR FENDER FOR SHIPS

This invention relates to a mechanical buffer of resilient material such as rubber, in particular a fender for ships.

Several types of such mechanical buffers are known. In general they are only adapted to take up relatively low forces and often they absorb energy in a manner, which is not adequate and which result in deformation of the buffer allowing only low amounts of energy to be taken up or giving deformations which cause wear and early damaging of such buffers. For smaller forces several known buffers are adequate, but for ships of ever increasing tonnage and dimensions known buffer structures are often only suited if they are used as an intricate set of a larger number of smaller units, which is difficult to support, or a cumbersome and voluminous body difficult to handle and requiring a large quantity of resilient material is necessary.

An object of the present invention is to provide an improved mechanical buffer of the type described above. To obtain this a mechanical buffer as has according to the invention, approximately the shape of a frustoconical cup spring. The resilient material has a reinforcement connected to it, consisting of elongated bodies such as bars positioned substantially in planes through the axis of the cone. The connection between reinforcement and resilient material is such that the sections of the wall of the spring in planes through the axis of the core are prevented from bending or buckling while allowing movement of these sections as a whole in such planes, said reinforcement being free from connections in peripheral directions, which would prevent the spring from deforming substantially freely in such directions under the resiliency of said resilient material, at most with the exception of one small axial zone of the spring.

As such, mechanical buffers in the shape of conical cup springs and made of rubber, nylon or similar elastic substances, are known for smaller dimensions, for instance for supporting vibrating machines. The disadvantages of such buffers are that undesired deformations of the wall of the cup occur if the axial load is high in relation to the chosen dimensions of the spring or if the load is working at an angle to the supporting surface of the cup.

Such deformations of the wall of the cup restrict the accumulation of energy for which the buffer should be used and the curve showing deformation in relation to load often shows a considerable increase of deformation for a small increase of load, or even with constant load, by instable microscopic deformation, the resistance against forces perpendicular to the axis being also very low. This is often no disadvantage for supporting vibrating machines if they are not too heavy. It is, however, very disadvantageous for very high forces such as occur in fenders for large ships.

In the present invention such disadvantages are removed, so that such a conical cup spring becomes very well suited for such conditions as in fenders for ships in combining a relatively large deformation to an optimum accumulation of energy. By the choice of the nature of the elastic material, the wall thickness and the shape thereof, the cone angle of the wall, the connection between reinforcement and resilient material, the possible prestress thereof, the means for reinforcement if desired preventing entirely or in part the deformation in certain zones at the side of tension or compression, it is possible to influence the energy accumulation and to adapt it to particular load situations for certain applications.

Preferably this invention is realized in such a way that the conical cup spring is connected at the end of the smallest diameter of the cone to a supporting structure, or rests against such a supporting structure, and extends freely with the edge of the largest diameter for allowing ships to come into contact with such a free edge, which could be thickened.

Such a fender shows the most favorable type of deformation in which, for further compression the resistance does not remain equal or decrease, as in several known buffers, but always increases.

When loading a buffer according to the invention it has the tendency not to give a rectilinear diagram of stresses from the tension side to the compression side of the cross-section, but to show tension and compression stresses, which remain relatively high from the outer zones inwardly up to the vicinity of the neutral zone, so that the stresses switch from tension to compression near the neutral zone over a short distance transversely thereto.

At the zone of support it is not necessary for the buffer to take up large forces tending to increase or decrease the diameter of the spring in that zone, as such a buffer is substantially stable in itself.

The reinforcing rods could be embedded entirely in the elastic material, they could be bonded intimately thereto or being cured therein. They could be connected to said resilient material in several points only and particularly if this is the case they even could be prestressed under tension to give a precompression in the elastic material.

The reinforcement could be positioned outside the cross-section of the elastic material, but is is preferable to have the reinforcement extend in the proximity of the center of the section of the wall thickness of the cone near the neutral zone so as to avoid buckling in an efficient manner, and the embedding is also favorable in avoiding corrosion of the reinforcement material.

Preferably at least part of the reinforcing rods are connected to form one or more unitary hairpin-shaped bodies and the most preferable embodiment of such a feature is that all the rods are connected to a single meandering body extending all around the periphery of the spring.

The rods could be circular in section or have any other desired cross-section, but in general and in particular when they are connected to hairpin-shaped bodies it is preferable to give them larger dimensions in a plane through the axis of the cone of the spring than the dimension in the peripheral direction.

The connection of the spring to the supporting structure could easily be obtained by having the wall of the conical body extend into a sleeve-shaped or similar connecting part integral with the conical body and positioned at the end of smallest diameter of the cone and in such a case the reinforcement rods could extend into said connecting part, if desired crossing a circumferential reinforcement in said part.

If a weak buffering action or a large deformation is desired it could be preferable to have the buffer consist of two or more conical cup springs connected with their parts of equal diameter, either smallest diameter or largest diameter, and the connection to the supporting structure could engage such a body at one of the axial ends, but preferably in the transition zone between the two conical bodies, from which zone flexible connecting means such as chains could extend to the supporting structure to keep said body in place.

The invention will now be explained in more detail with reference to the enclosed drawings, which, by way of example only, give several preferred embodiments of the invention.

FIG. 1 shows an axial section through a ship's fender according to the invention;

FIG. 2 gives an axial view of this buffer;

FIG. 3 gives somewhat diagrammatically a buffer according to the invention, consisting of two conical springs;

FIG. 4 gives an other possibility of embodying a buffer as a body from two conical cup springs.

Figure 1:
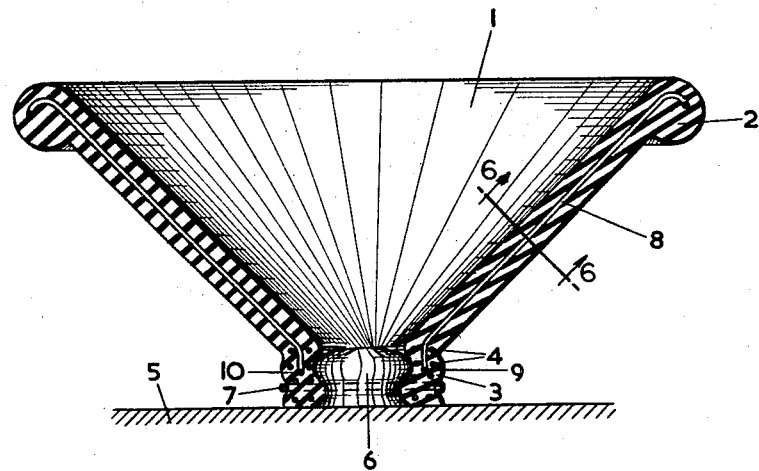
Figure 2:
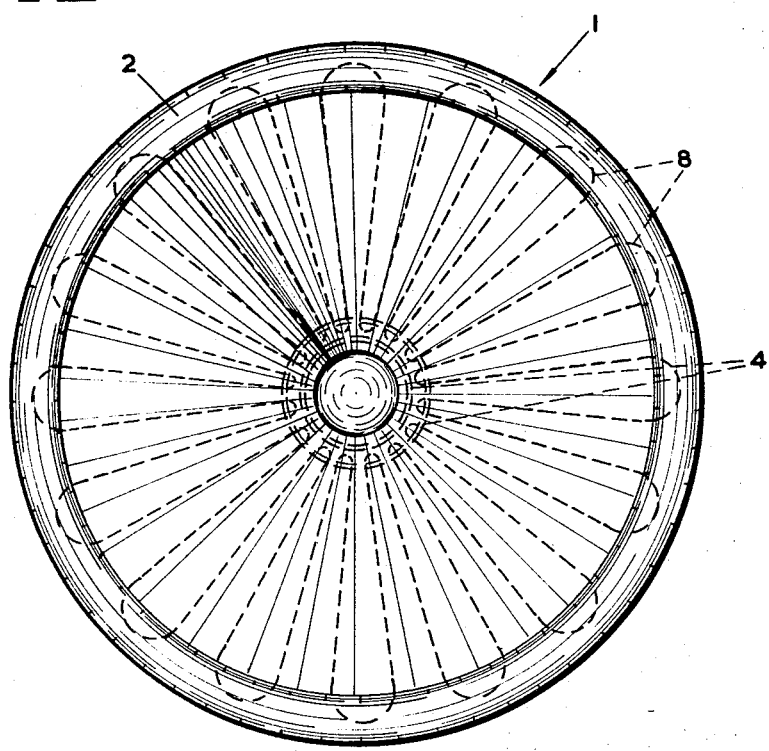

In FIG. 1 and 2 numeral 1 indicates the frusto-conical body of the buffer, consisting of rubber of similar elastic material. This material could be an elastic synthetic material and at present it is deemed that a mixture of rubber and Nylon 66 is preferable also to allow a good bond between the reinforcement and this material.

The free edge of the conical body is thickened at 2 and at the other end this body has a substantially cylindrical continuation 3 with a peripheral reinforcement 4. Numeral 5 indicates a stationary supporting structure such as part of a jetty, provided with a protuberance 6. Part 3 engages around protuberance 6 and is for instance secured thereto by a tensioned strap 7 clamping the spring behind the thickened head of the protuberance 6. It is also possible to have the buffer kept in place by such a protuberance in a loose manner, for instance by having such a protuberance extend further into the cone and having a larger protruding head engaging the interior wall of the cone.

The reinforcement is formed by a closed meandering body from high quality steel rods, for instance of spring steel, with preferably a rectangular cross-section with rounded edges, said rectangle having the longest side in the plane of FIG. 1. This body is indicated by 8 and is so to say a combination of separate rods, each positioned in a plane through the axis of the cone and connected at the inner and outer end by a bend to adjacent rods.

At the right in FIG. 1 it has been shown how such rods terminate at 9, as is the situation in FIG. 2. At the left in FIG. 1 the reinforcing rods terminate at 10, so that they cross the circumferential reinforcement 4 and extend over some distance into part 3.

The rods of body 8 are positioned in the center of the thickness of the wall of body 1. The bends by which they are connected allow a decrease or increase of the diameter of the body 1 as occurs when this is loaded, for instance by a ship pushing against the thickened edge 2.

Figure 3:
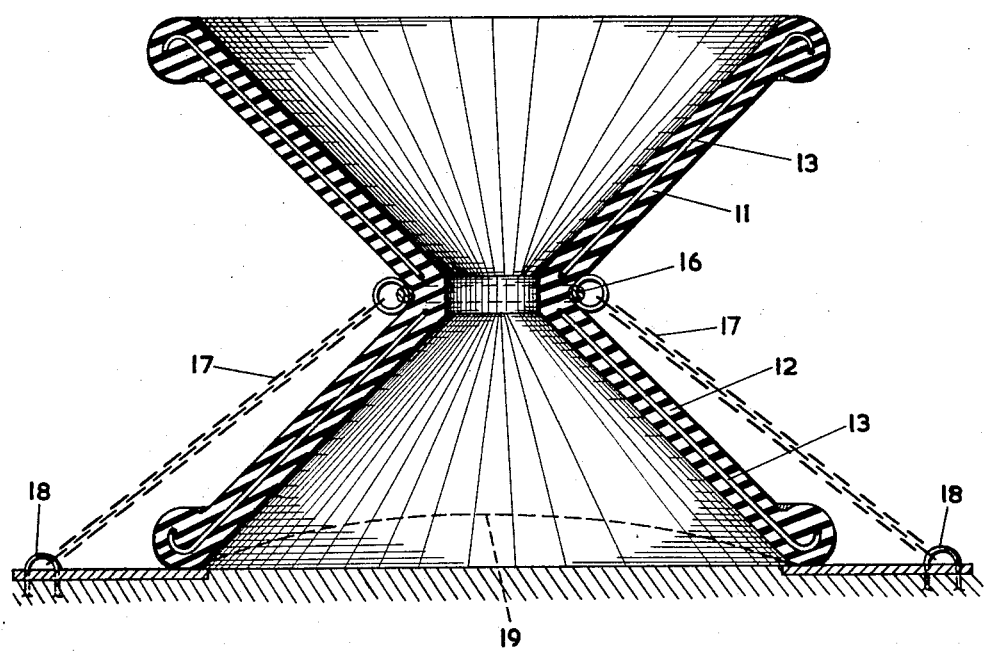

In FIG. 3 two frustoconical bodies 11 and 12 constitute one unitary body, both having a separate reinforcement 13, each shaped in the same way as the rods of body 8 in FIGS. 1 and 2.

In the throat of this body there is a central opening and around this throat a steel ring 16 is provided, which is not intimately united to the material of the spring itself. A number of chains 17 engage this ring 16 and connect the entire body to a stationary supporting structure at 18 in such a way that the body is mainly kept in place, but is allowed to deform and even to displace both with respect to the axis and with respect to the face of the supporting structure for all types of axial or eccentric loads.

The face of the jetty or the like could have a spherical protruding part 19 for centering the spring body. It is also possible to connect two frusto-conical bodies together as shown in FIGS. 1 and 2 with their narrow ends while remaining separate bodies and not being integral.

Figure 4:
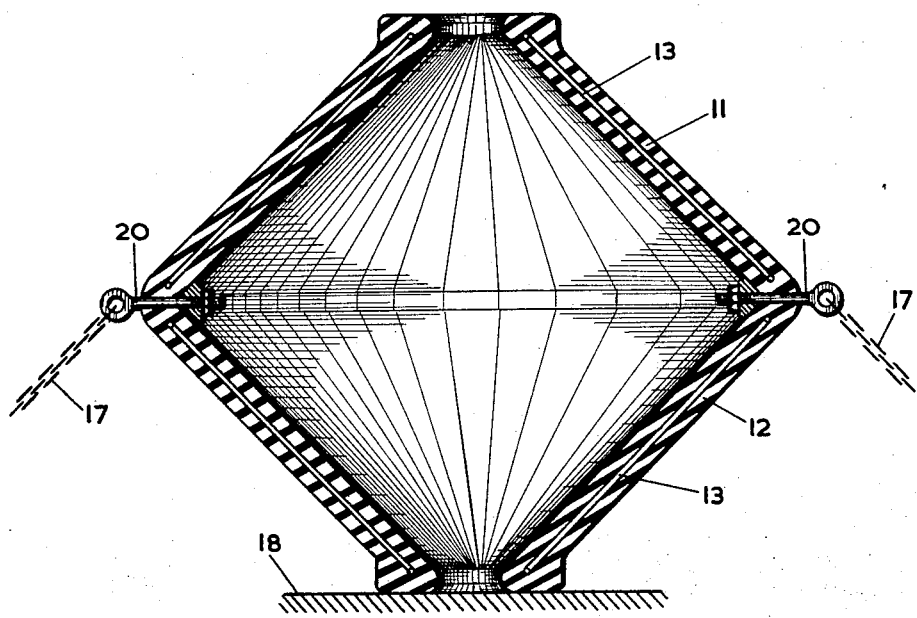

FIG. 4 shows that the buffer body could consist of two cones with the largest diameters connected to each other, each having a reinforcement 13 as described. This body is held in place also by chains 17 connecting it to the supporting structure 18, said chains being connected to eye-bolts 20 protruding through the body itself in the zone of largest diameter.

Ships impacting against such fenders will in the embodiments of FIGS. 1 and 3 meet a large area of contact taking up the forces, which gives only low concentrations of load so that buffer and ship wall are protected. If desired the contacting area between buffer and ship could even be provided with a coating or part of a material with low friction.

On the other hand the embodiment of FIG. 4 has advantages in several circumstances. If desired there could be one cone like the lower cone in FIG. 3 being the only frustoconocal part of the buffer.

Figure 5:
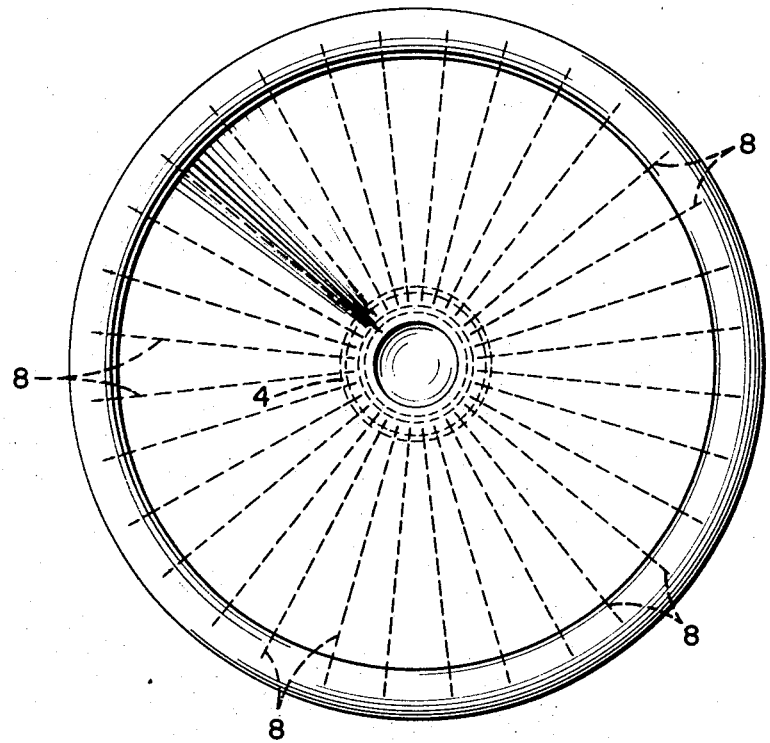
FIG. 5 is an axial view of an alternate embodiment of the present buffer.
Figures 6, 7, 8:
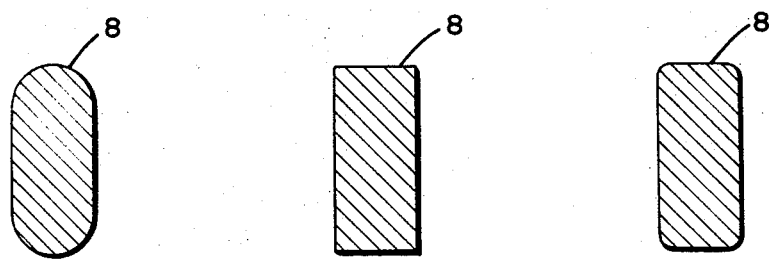
FIG. 6 is a sectional view taken along line 6—6 in FIG. 1; showing the reinforcing bars in cross-section.
FIGS. 7 and 8 are alternate embodiments of the bar cross-section of FIG. 6.

In the embodiment of this invention where the reinforcement bars are not connected as a single meandering body, each bar terminates within the peripheral reinforcement 4. This construction is shown in axial view in FIG. 5. The section view thereof is similar to that of FIG. 1 with the bar ends adjacent the major diameter being preferably downwardly curved as shown in FIG. 1 but of course without the sectioning (which indicates the cutting of interconnecting hairpin curves.

The resilient material of the conical body needs not have the same thickness throughout, but could have a decreasing or increasing thickness, particularly a gradually varying thickness dependent upon the required characteristics of deformation and energy accumulation.

In FIGS. 1 and 2 the smallest diameter of the cone is restricted in circumferential deformation by the reinforcement, but it is also possible to apply such a circumferential reinforcement in the part of the largest diameter, for instance by embedding an annular steel body therein. It is also possible to apply such a circumferential reinforcement somewhere between the axial ends of the conical body. There should, however, be such a circumferential reinforcement in one axial zone only to allow a resilient variation in diameters in all the other zones.

By choosing the correct zone for the circumferential reinforcement it is possible to fix the neutral zone at the desired location.

I claim:
1. A resilient mechanical buffer, such as a fender for ships, comprising:
   a. a frusto-conical cup-shaped body of resilient material having side walls extending from a zone of minor diameter to a zone of major diameter;
   b. a plurality of elongated relatively rigid reinforcement bars intimately connected to said side walls extending along at least a part of the length thereof, the rigidity of said bars being sufficient to prevent bending and buckling of said body in the plane of said side walls when impacted by a ship;
   c. means preventing radial movement of adjacent reinforcement bars near only one of said zones with adjacent bars in the other zone being free to move peripherally in relation to one another, along with the resilient material.

2. The buffer of claim 1 in which the means preventing radial movement of adjacent bars is in the zone of major diameter.

3. The buffer of claim 1 in which the means preventing radial movement of adjacent bars is in the zone of minor diameter.

4. The buffer of claim 1 in which the reinforcing bars are of oblong cross-section, having a greater dimension in a plane which intersects the axis of the cone than in the peripheral direction.

5. A mechanical buffer according to claim 1, in which the minor diameter of the conical body rests against a supporting structure, the other end protruding freely to allow ships to contact said other end.

6. A mechanical buffer according to claim 1, in which the bars are pretensioned so as to exert a precompression on the elastic material.

7. A mechanical buffer according to claim 1, in which the wall of the body continues integrally as a sleeve-shaped connecting part at the minor diameter of the cone.

8. A mechanical buffer according to claim 8, in which which the reinforcing bars protrude into the said connecting part.

9. A mechanical buffer according to claim 1, in which there are two cup-shaped frusto-conical bodies connected to each other at their ends of the same diameter.

10. A mechanical buffer according to claim 9, with connecting means for connecting bodies to the surrounding structure, said connecting means being flexible and being connected to the composite body formed by the two bodies in the zone where these bodies are connected together.

11. A mechanical buffer according to claim 1 positioned with a largest diameter of the cone-shaped body in contact with a surrounding supporting structure, said supporting structure having a convexly protruding part extending into said conical body.

12. A resilient mechanical buffer, such as a fender for ships, comprising:
   a. a frusto-conical cup-shaped body of resilient material having side walls extending from a minor diameter to a major diameter;
   b. a plurality of elongated relatively rigid reinforcement bars intimately connected to said side walls extending along at least a part of the length thereof, the rigidity of said bars being sufficient to prevent bending and buckling of said body in the plane of said side walls when impacted by a ship;
   c. means preventing radial movement of adjacent reinforcement bars at the minor diameter only with the ends of adjacent reinforcement bars at the major diameter being free to move peripherally in relation to one another along with the resilient material when a substantially axial pressure is applied to the buffer.

13. A resilient mechanical buffer such as a fender for ships, comprising:
   a. a frusto-conical cup-shaped body of resilient material having side walls extending from a zone of minor diameter to a zone of major diameter;
   b. reinforcement means intimately connected to said side walls comprising a plurality of relatively rigid reinforcement bars intimately connected to said side walls extending along at least a part of the length thereof with alternate ends of alternate bars being connected to each other to form a single meandering reinforcement in the body, the rigidity of said bars being sufficient to prevent bending and buckling of said body in the plane of said side walls when impacted by a ship;
   c. means preventing radial movement of adjacent reinforcement bars at the minor diameter.

14. The buffer of claim 13 in which the alternate ends of alternate bars are connected by a hairpin shaped curve in the bars.

* * * * *